(12) United States Patent
Krueger

(10) Patent No.: US 10,697,395 B2
(45) Date of Patent: *Jun. 30, 2020

(54) GENERATION OF A PULSED JET BY JET VECTORING THROUGH A NOZZLE WITH MULTIPLE OUTLETS

(71) Applicant: Southern Methodist University, Dallas, TX (US)

(72) Inventor: Paul S. Krueger, Plano, TX (US)

(73) Assignee: Southern Methodist University, Dallas, TX (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/796,772

(22) Filed: Jul. 10, 2015

(65) Prior Publication Data

US 2015/0315998 A1 Nov. 5, 2015

Related U.S. Application Data

(63) Continuation of application No. 12/726,826, filed on Mar. 18, 2010, now Pat. No. 9,108,711.

(Continued)

(51) Int. Cl.
*F02K 1/00* (2006.01)
*F02K 9/82* (2006.01)
(Continued)

(52) U.S. Cl.
CPC ............ *F02K 1/008* (2013.01); *B63H 25/46* (2013.01); *E02F 3/9206* (2013.01); *F02K 1/002* (2013.01);
(Continued)

(58) Field of Classification Search
CPC . B63H 25/46; F15D 1/08; F15D 1/009; F02K 1/002; F02K 1/004; F02K 1/006; F02K 1/008; F02K 1/28; F02K 9/28
See application file for complete search history.

(56) References Cited

U.S. PATENT DOCUMENTS 2,763,125 A 8/1956 Kadosch et al.
3,071,154 A 1/1963 Cargill et al.
(Continued)

OTHER PUBLICATIONS

Allen, D., et al., "Axisymmetric Coanda-assisted vectoring," Exp Fluids, vol. 46, Jul. 5, 2008, pp. 55-64.
(Continued)

*Primary Examiner* — Scott J Walthour
(74) *Attorney, Agent, or Firm* — Edwin S. Flores; Chalker Flores, LLP

(57) ABSTRACT

A method of producing a pulsatile jet flow from a substantially constant flow primary jet in a way that is mechanically efficient, easy to implement, and allows direct control over pulse duration and pulsing frequency is disclosed herein. The invention includes at least two components: (a) a constant flow fluid jet produced by any normal method (e.g., propeller) that can be directionally vectored fluidically, mechanically, or electromagnetically and (b) a nozzle with multiple outlets (orifices) through which the vectored jet may be directed. By alternately vectoring the jet through different outlets, a transient (pulsatile) flow at an outlet is obtained even with a substantially constant primary jet flow. Additionally, the nozzle outlets may be oriented in different directions to provide thrust vectoring, making the invention useful for maneuvering, directional control, etc.

6 Claims, 3 Drawing Sheets

Related U.S. Application Data

(60) Provisional application No. 61/162,552, filed on Mar. 23, 2009.

(51) Int. Cl.

| | | |
|---|---|---|
| *F02K 9/28* | (2006.01) | |
| *F15D 1/08* | (2006.01) | |
| *F02K 1/28* | (2006.01) | |
| *E02F 3/92* | (2006.01) | |
| *B63H 25/46* | (2006.01) | |

(52) U.S. Cl.
CPC ............... *F02K 1/28* (2013.01); *F02K 9/28* (2013.01); *F02K 9/82* (2013.01); *F15D 1/08* (2013.01)

(56) References Cited

U.S. PATENT DOCUMENTS

| | | | |
|---|---|---|---|
| 3,122,165 | A | 2/1964 | Horton |
| 3,143,856 | A | 8/1964 | Hausmann |
| 3,204,405 | A | 9/1965 | Warren et al. |
| 3,342,198 | A | 9/1967 | Groeber |
| 3,740,003 | A | 6/1973 | Ayre et al. |
| 3,797,527 | A * | 3/1974 | Bain ............... B63H 25/46 137/832 |
| 3,802,190 | A | 4/1974 | Kaufmann |
| 3,883,075 | A | 5/1975 | Edney |
| 3,977,629 | A | 8/1976 | Tubeuf |
| 4,077,569 | A | 3/1978 | Deines |
| 4,267,856 | A | 5/1981 | Kwok et al. |
| 4,389,071 | A | 6/1983 | Johnson, Jr. et al. |
| 4,607,792 | A | 8/1986 | Young, III |
| 4,681,264 | A | 7/1987 | Johnson, Jr. |
| 4,863,101 | A | 9/1989 | Pater et al. |
| 5,060,867 | A | 10/1991 | Luxton et al. |
| 5,211,006 | A * | 5/1993 | Sohnly ............... B64G 1/405 60/202 |
| 5,495,903 | A | 3/1996 | Griffin et al. |
| 5,690,280 | A | 11/1997 | Holowach et al. |
| 6,040,548 | A | 3/2000 | Siniaguine |
| 6,868,790 | B1 | 3/2005 | Gieseke et al. |
| 9,108,711 | B2 | 8/2015 | Krueger |
| 2002/0184874 | A1 | 12/2002 | Modglin et al. |
| 2003/0209006 | A1 | 11/2003 | Gharib et al. |
| 2007/0158468 | A1 * | 7/2007 | Smith ............... B05B 1/12 239/423 |
| 2010/0237165 | A1 | 9/2010 | Krueger |

OTHER PUBLICATIONS

Bartol, I., et al., "Swimming dynamics and propulsive efficiency of squids throughout ontogeny," Integrative and Comparative Biology, vol. 48:6, May 20, 2008, pp. 720-733.

Bartol, I., et al., "Hydrodynamics of pulsed jetting in juvenile and adult brief squid Lolliguncula brevis: evidence of multiple jet modes and their implications for propulsive efficiency," The Journal of Experimental Biology 212, Mar. 5, 2009, pp. 1889-1903.

Berrier, B.L., et al., "A Review of Thrust-Vectoring Schemes for Fighter Aircraft," AIAA/SAE 14th Joint Propulsion Conference, Las Vegas, NV, Jul. 25-27, 1978, 14 pp.

Choutapalli, I., et al., "An Experimental Study of Pulsed Jet Ejector," 43rd AIAA Aerospace Sciences Meeting and Exhibit, Reno, NV, Jan. 10-13, 2005.

Gharib, M., et al., "A universal time scale for vortex ring information," J. Fluid Mech., vol. 360, 1998, pp. 121-140.

Krueger, P., et al., "Thrust Augmentation and Vortex Ring Evolution in a Fully Pulsed Jet," AIAA Journal, vol. 43, No. 4, Apr. 2005, 10 pp.

Mason, M., et al., "Fluidic Thrust Vectoring of Low Observable Aircraft," CEAS Aerospace Aerodynamic Research Conference, Cambridge, UK, Jun. 10-12, 2002, 7 pp.

Nichols, J.T., et al., "Preferormance of a Self-Propelled Pulsed-Jet Vehicle," 38th Fluid Dynamics Conference and Exhibit, Seattle, WA, Jun. 23-26, 2008.

Smith, B.L., et al., "Jet Vectoring Using Synthetic Jets," J. Fluid Mech., vol. 458, 2002, pp. 1-34.

Strykowski, P.J., et al., "Counterilow Thrust Vectoring of Supersonic Jets,"AIAA Journal, vol. 34:11, Nov. 1996, pp. 2306-2314.

Ward, C., "Circulation Control Technique on a Marine Propeller Duct," Dpt. of Naval Architecture & Marine Engineering, Universities of Glasgow and Strathclyde, Aug. 2006, 108 pp.

Wilson, J., et al., "Unsteady Ejector Performance: An Experimental Investigation Using a Resonance Tube Driver," NASA/TM-2002-211474, AIAA-2002-3632, Jul. 2002, 19 pp.

* cited by examiner

US 10,697,395 B2

GENERATION OF A PULSED JET BY JET VECTORING THROUGH A NOZZLE WITH MULTIPLE OUTLETS

CROSS-REFERENCE TO RELATED APPLICATIONS

This application is a continuation of, and claims priority to, U.S. patent application Ser. No. 12/726,826 filed Mar. 18, 2010, and claims priority to U.S. Provisional Application Ser. No. 61/162,552, filed Mar. 23, 2009, each of which is incorporated herein by reference in its entirety.

TECHNICAL FIELD OF THE INVENTION

The present invention relates in general to the field of jet propulsion and thrust vectoring, and more particularly, to devices and methods that provide pulsatile jet flow from a constant jet flow.

STATEMENT OF FEDERALLY FUNDED RESEARCH

None.

REFERENCE TO A SEQUENCE LISTING

None.

BACKGROUND OF THE INVENTION

Without limiting the scope of the invention, its background is described in connection with pulsatile jet flow.

Pulsed jets have found application in a variety of situations ranging from erosion and breaking of solid components in drilling applications (e.g., U.S. Pat. Nos. 4,607,792, 4,681,264, and 4,389,071) to propulsion. In studies related to propulsion, results for fixed/tethered jets have shown that jet pulsation may be used to augment thrust over equivalent steady jets (Choutapalli, 2006; Krueger and Gharib, 2005). Additionally, studies of vehicles and aquatic animals propelled by pulsed jets have shown that short pulses producing isolated vortex rings have higher propulsive efficiency than longer jet pulses (Bartol et al., 2008; Bartol et al., 2009); Nichols, et al., 2008). Thus, in a variety of applications involving jet flow, it may be advantageous for the jet flow to be pulsed.

Numerous means for pulsing jet flows have been proposed and implemented in the scholarly and patent literature. One common method is to use transient piston motion to effect jet pulsations. For example, a piston situated in a plenum (as in Krueger and Gharib, 2005) may move forward in short steps to eject fluid slugs from a nozzle. Alternatively, the piston may oscillate back and forth with the direction of fluid motion governed by check valves (as in Nichols, et al., 2008) so that forward translation of the piston ejects a fluid slug from a nozzle while no net fluid motion occurs during piston retraction. Similarly, in U.S. Pat. No. 4,607,792 a liquid jet pulse is ejected into air by the forward motion of a piston and the plenum is recharged with liquid upon retraction of the piston. Cycling the piston motion generates a pulsed jet.

Another common method for creating jet pulses is to "shutter" a primary jet. In U.S. Pat. No. 3,883,075, pressurized flow is directed to a rotating nozzle block containing nozzles at fixed angular locations around the block. As the nozzle block is rotated, a jet pulse is released every time a nozzle aligns with the flow supply. Similarly, Choutapalli (2006) uses a spinning disk with holes to "chop" the flow supply before it reaches the nozzle, resulting in interruptions to the flow and discrete jet pulses exiting the nozzle. An alternative valving mechanism for generating jet pulses is described in U.S. Pat. Nos. 4,077,569 and 4,863,101. In this method a pressurized flow source is directed into a plenum with a specialized preloaded valve system in which the fluid pressure causes the valve to open, releasing a fluid pulse. When the pressure drops upon opening of the valve, the loading on the valve induces it to close and the flow ceases until the cycle repeats.

A further method for generating jet pulsations, described in Wilson and Paxson (2002) and in U.S. Pat. Nos. 5,495,903, 4,681,264, and 4,389,071, is to use specially shaped channels such as Helmholtz resonators, organ pipes, or resonance tubes to establish and amplify natural fluid oscillations upstream of the flow exit. The resulting oscillations lead to jet pulsation at the flow exit.

An additional method for generating jet pulses is described in U.S. Pat. No. 6,868,790 and utilizes a combustion reaction to drive fluid out of a nozzle in finite bursts of duration related to the burn time of the combustion reaction.

In the prior art described above, the method of pulsation is either the primary means for driving the flow (as with piston-operated pulsation methods) or it is used in series with the primary flow (as in the cases where pulsation is achieved by interrupting the flow). None of the methods described above attempt to keep the primary flow steady (constant) while redirecting it to different nozzle outlets to generate jet pulses as described in the present invention. Generating jet pulses by interrupting or inducing oscillations in the primary flow leads to large pressure fluctuations in the flow and/or requires large storage plenums to properly drive the flow. Using piston-displacement methods to generate jet pulses tends to be inefficient as time and energy are expended retracting the piston and/or refilling the plenum. Hence, in applications such as propulsion it may be preferable to use the method of the present invention so that the advantages of jet pulsation may be gleaned while keeping the primary jet flow substantially steady, thereby allowing efficient and simple means such as ducted fans/propellers to generate the primary flow.

An additional method for generating jet pulses using a valve mechanism is described in U.S. Pat. No. 4,267,856. The method utilizes a single jet inlet and multiple jet outlets with a freely moving obstruction (typically a rubber sphere). The obstruction alternately blocks each of the outlets for a brief period, halting (and hence, pulsing) the flow from that orifice, but no method is provided for controlling the frequency or duration of jet pulses.

U.S. Pat. No. 4,681,264 describes a method for generating jet pulses using a fluid oscillator valve. In this method, pulses are generated by alternately directing inlet flow to two different outlets using pressure feedback loops connected to the primary flow conduit that direct the flow to the respective outlets in time intervals associated with the propagation of pressure pulses through the loops.

SUMMARY OF THE INVENTION

The present invention includes at least two components: (a) a constant flow (steady) fluid jet produced by any normal method (e.g., propeller) that can be directionally vectored either fluidically (using the Coanda effect, synthetic jets, counter flow, or other means), mechanically (using valves, vanes, or other means), or electromagnetically (using electric and/or magnetic fields to apply side forces to charged particles in the flow) and (b) a nozzle with multiple outlets (orifices) through which the vectored jet may be directed. By alternately vectoring the jet through different outlets, the flow at an outlet will be transient (pulsatile) even though the flow of the primary jet is substantially constant. The purpose of this invention is to produce pulsatile jet flow from a substantially constant flow primary jet in a way that is mechanically efficient, easy to implement, and allows direct control over pulse duration and pulsing frequency. Sufficiently short jet pulses are known to generate compact vortical structures (vortex rings), which have been shown to augment thrust and propulsive efficiency as compared to longer jet pulses and are useful in a variety of marine or aerial propulsion applications. Additionally, the nozzle outlets may be oriented in different directions to provide thrust vectoring, making the invention useful for maneuvering and directional control.

In one embodiment, the present invention is a vectored jet thrust device comprising: a substantially constant flow fluid jet whose downstream trajectory may be vectored at a multiplicity or a continuum of angles with respect to the axis of the upstream flow; two or more fluid conduits in fluid communication with the jet; and a nozzle with one or more outlets in fluid communication with the fluid conduits. In one aspect, the constant flow primary jet is directionally vectored fluidically, mechanically or electromagnetically such that pulsatile flow is emitted from the outlet(s) by alternately vectoring the jet between the available conduits. In another aspect, the primary jet is directionally vectored to the conduits fluidically by secondary control jets that generate a Coanda effect, secondary control jets that vector the primary jet by a momentum conservation effect, synthetic jets, or counter flow. In another aspect, the jet is directionally vectored to the conduits mechanically by valves or vanes. In yet another aspect, the jet is directionally vectored to the conduits electromagnetically by an electric field, a magnetic field, or both. For example, a jet of charged particles is directionally vectored electromagnetically by an electric field, a magnetic field, or both that apply side forces to charged particles in the fluid. In another aspect, exhaust from the nozzle outlets comprise short jet pulses generated by alternately vectoring the jet between fluid conduits to generate compact vortical structures (vortex rings). The present invention may further comprise one or more fluid outlets in fluid communication with the fluid conduits capable of being oriented in different angles relative to the upstream orientation of the jet to provide thrust vectoring, directional control, or propulsion. In another aspect, the constant flow primary fluid jet is generated by a ducted fan/propeller, compressed air released through a nozzle, a turbojet engine, jet engine, turboprop, ramjet, rocket propulsion, and/or scramjet.

In another embodiment, the present invention is a system for vectored jet thrust comprising: a device that generates a substantially constant flow fluid jet whose downstream trajectory is vectored at a multiplicity or a continuum of angles with respect to the axis of the upstream flow; two or more fluid conduits in fluid communication with the jet; and a nozzle with one or more outlets in fluid communication with the fluid conduits, wherein the constant flow primary jet is alternately vectored fluidically, mechanically, or electromagnetically to the fluid conduits such that the flow of the fluid exiting the nozzle outlet(s) varies transiently.

In yet another embodiment, the present invention is a method for vectored jet thrust from a jet comprising: generating a generally constant flow fluid jet whose downstream trajectory is vectored at a multiplicity or a continuum of angles with respect to the axis of the upstream flow; connecting the fluid jet to two or more fluid conduits in fluid communication with the jet; and positioning a nozzle with one or more outlets in fluid communication with the fluid conduits, wherein the constant flow primary jet is alternately vectored fluidically, mechanically, or electromagnetically to the fluid conduits such that the flow of the fluid exiting the nozzle outlet(s) varies transiently.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
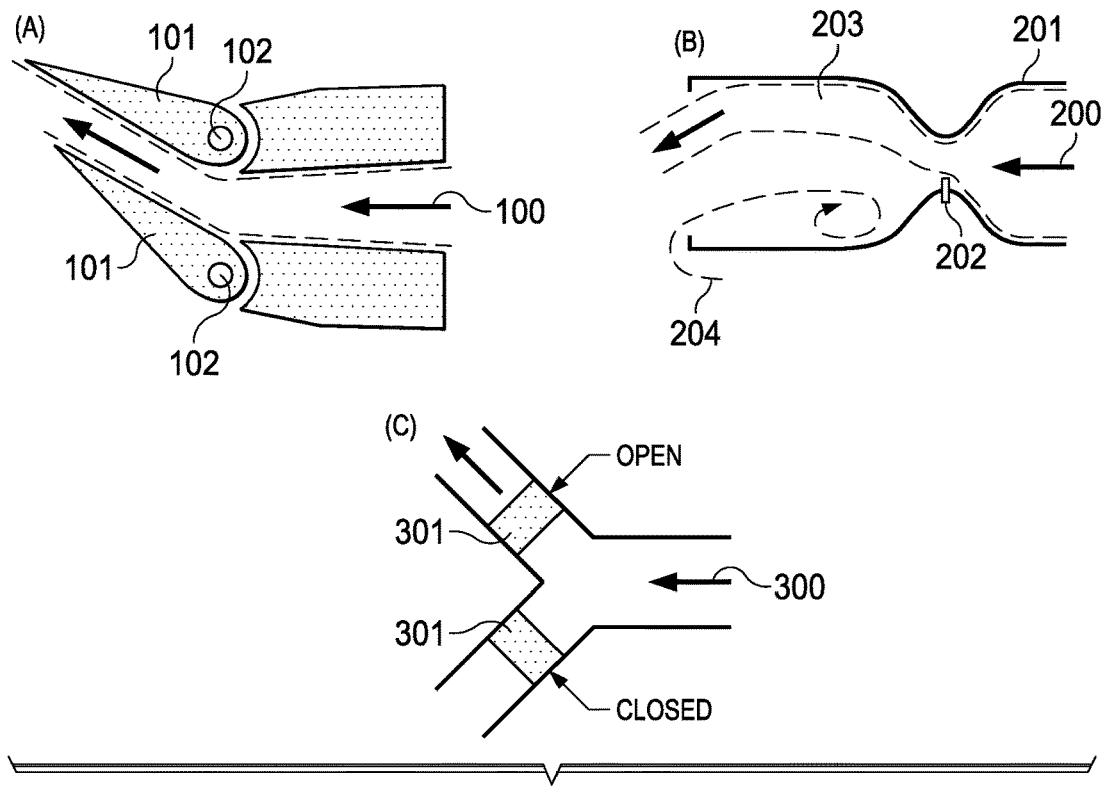
FIG. 1. Examples of Mechanical Jet Vectoring: (a) Jet vectoring using vanes, (b) vectoring using a movable protuberance in a specially contoured nozzle, and (c) vectoring using multiple conduits with valves.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "vectored jet" refers to a fluid jet whose downstream direction may be altered from its upstream direction.

The term "nozzle" as used herein covers any conventional or preferred static mechanical devices used to direct or modify the flow of a fluid (liquid or gas). Nozzles are frequently used to control the rate of flow, speed, direction, mass, shape, and/or the pressure of the stream that emerges from them.

The term "valves" as used herein encompasses devices that regulate the flow of a fluid (gases, liquids, fluidized solids, or slurries) by opening, closing, or partially obstructing various passageways. The term "vanes" as used herein refers generally to blades, shutters and other plane or curved members.

The term "fluid jet" as used herein is intended to be broadly construed and includes, without limitation, high pressure fluid beam and should be read to include both jets made of liquid and jets made of vapor.

The term "fluid conduit" as used herein, includes both a closed conduit, such as a pipeline or other substantially tubular member, and an open conduit such as an aqueduct for transporting liquids such as water. Such conduits may extend for tens, hundreds, or thousands of kilometers and may be used to transport liquids, gases, slurries or other fluids.

The term "electric field" as used herein denotes the application of a voltage between two electrodes. The general term electric field thus denotes a potential difference between the electrodes and may induce the motion of electric charge (current).

As used herein the term "magnetic field" refers to a random variable at least partly representing said magnetic field, such as e.g. the modulus of the magnetic field or the magnetic field vector.

The term "propeller", herein, refers to propulsion propellers and impellers, such as for water propellers and for aircraft propellers (propulsion props, turbine blades, helicopter blades), as well as to stationary propellers and impellers used in high-power fans (wind tunnels, high velocity fluid pumps) and stationary turbines. The term "jet engine" as described herein includes various types of engines which take in air at a relatively low speed and modifies it thermomechanically, and discharges the air at a much higher speed. The term jet engine includes, for example, turbo jet engines and turbo-fan engines.

As used herein the term "turbojet engine" is intended to encompass all jet engines employing a compressor, a combustor and a turbine for generating a high energy exhaust stream that is directed away from the engine to yield a reactive thrust component on the engine and consequently on an airplane in which the engine is mounted.

The term "ramjet" is intended to include scramjets, where appropriate. Scramjet engines provide propulsion at hypersonic speeds (i.e., above Mach 5) by capturing atmospheric air to burn onboard fuel. For hypersonic propulsion, these air breathing engines are more efficient than rocket motors and can allow longer duration hypersonic flight with greater payload.

The term "hydrodynamics" as used herein refers to the study of liquids in motion.

Fluid jets used for propulsion accelerate ambient fluid to create a reaction force that propels the vehicle forward. Pulsing the flow using discrete fluid pulses with little or no flow between pulses engenders the formation of a vortex ring with each jet pulse. If the pulses are short enough, isolated vortex rings are formed, but for longer jet pulses, the vortex ring will stop forming midway through the pulse and the remainder of the pulse will be ejected as a quasi-steady jet (Gharib et al., 1998). For jet pulses short enough to produce isolated vortex rings, thrust is augmented and propulsive efficiency is improved (Bartol et al., 2008; Bartol et al., 2009); Krueger and Gharib, 2005). For these reasons, it may be advantageous in certain propulsion applications to use a pulsed jet, but the jet pulsations must be produced in a mechanically simple and efficient way in order for such an approach to be practical. The present invention describes an apparatus, system, and method for producing a pulsed jet from a constant flow (steady) jet and controlling the duration and frequency of the resulting pulses using a specially designed nozzle and a control mechanism for vectoring the jet.

The invention includes two primary components. The first component is a substantially constant flow (steady) primary jet equipped with a mechanism that allows it to be vectored through different angles off axis from the original jet direction. The jet itself may be generated by any typical devices or methods for generating a steady fluid jet such as a ducted fan/propeller, compressed air released through a nozzle, a turbojet engine, jet engine, turboprop, ramjet, rocket propulsion, and/or scramjet. The jet vectoring mechanism may be mechanical, fluidic, or electromagnetic. Three examples of mechanical jet vectoring mechanisms are shown in FIG. 1. FIG. 1(a) illustrates jet vectoring using directional vanes as described in Berrier and Re (1975). In this method, a constant flow jet (100) flows between directional vanes (101). By pivoting the vanes about hinges (102), the vanes may be deflected and the direction of the jet altered. A second method illustrated in FIG. 1(b) utilizes the method described in U.S. Pat. No. 5,060,867 for vectoring the jet angle. In this method, a constant fluid flow (200) passes through a contoured convergent-divergent nozzle (201). The divergent portion of the nozzle is contoured so that when a protuberance (202) is placed in the flow, the flow separates from the side with the protuberance but remains attached to the opposite side, resulting in an attached jet flow (203) on part of a fluid conduit coupled to the convergent-divergent nozzle. At the conduit exit, reentrant flow (204) enters opposite the attached flow and induces a low pressure that deflects the attached jet toward the reentrant flow as shown. By moving the protuberance to another azimuthal location, the jet may be vectored in a different direction. A third method for jet vectoring using mechanical means is to use multiple valves and conduits as shown in FIG. 1(c). In this method, constant flow (300) is directed through either of two or more conduits using valves (301). To direct the flow, one valve is open while the others remain closed. To direct the flow in a new direction, a new valve is opened while all others are closed.

Figure 2:
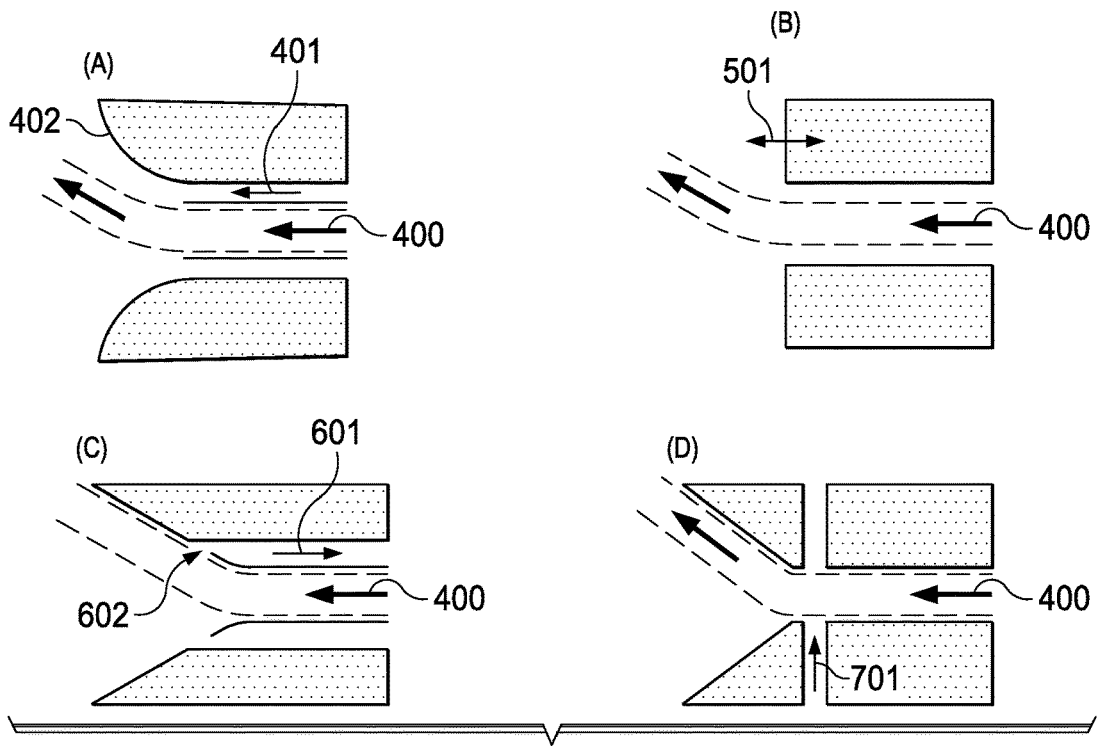
FIG. 2. Examples of Fluidic Jet Vectoring: (a) Coanda-Assisted Jet Vectoring, (b) Synthetic-Jet Actuator Jet Vectoring, (c) Counterflow Jet Vectoring, and (d) Control Jet Actuated Jet Vectoring.

Examples of fluidic jet vectoring are shown in FIG. 2. The Coanda-assisted method (FIG. 2(a)) is described in Allen and Smith (2009), Ward (2006), and Mason and Crowther, (2002). This method utilizes a high velocity, low mass flux control jet (401) next to a curved surface (402) to induce a low pressure on the side of the control jet, leading the constant flow primary jet (400) to bend preferentially toward the side of the control jet. The angle of deflection is controlled by the ratio of mass fluxes of the two jets and the azimuthal direction (top/bottom, left/right, etc.) is controlled by the azimuthal location of the control jet. The synthetic jet actuator method (FIG. 2(b)) is described in Smith and Glezer (2002) and uses a small, high frequency synthetic jet (501) next to the constant flow primary jet. The rhythmic suction and pulsing produced next to the primary jet by the synthetic jet induces a recirculation (entrainment) flow that causes the primary jet (400) to bend toward the synthetic jet. Another example of fluidic jet vectoring is the counterflow method, described in Strykowski et al. (1996) and illustrated in FIG. 2(c). In this method suction (601) is used to pull fluid through a slot (602) next to the constant flow primary jet, inducing the jet to deflect toward the suction slot. A fourth example of fluidic jet vectoring is the control jet method introduced in various forms in U.S. Pat. Nos. 3,204,405 and 3,740,003 and illustrated in FIG. 2(d). In this method a control jet (701) is injected into the constant flow primary jet (400) at an angle to the direction of the primary jet. Momentum conservation of the combined jets induces the primary jet to deflect in the direction of the control jet as shown.

Figure 3:
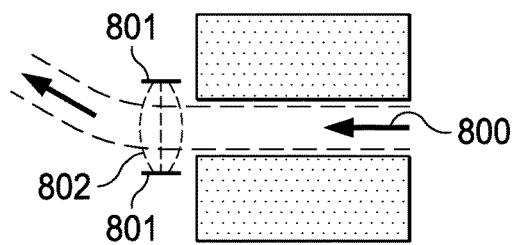
FIG. 3. Example of Jet Deflection Using Electromagnetic Actuation.

Electromagnetic systems may also be used to vector the jet if it contains charged particles (as in the case of a plasma jet). An example of this method is illustrated in FIG. 3. In this case a constant flow containing charged particles (800) passes between electrodes (801). The electrodes may be biased with a voltage difference generating an electric field (802) between them. The action of this electric field on the charged particles imparts a tangential momentum to the jet particles and deflects the jet to one side, similar to the control of the electron beam in a cathode-ray tube (CRT). Alternatively, the electrodes (801) may be the ends of a U-shaped electromagnet (as described in U.S. Pat. No. 6,040,548, relevant portions incorporated herein by reference), in which case (802) is a magnetic field and the jet particles are deflected (vectored) off axis under the action of the Lorentz force.

The mechanical, fluidic, and electromagnetic methods for jet vectoring described above substantially cover the methods used in the art, but derivatives of these methods or other jet vectoring methods known to one familiar with the art may also be applied to the present invention.

Figure 4:
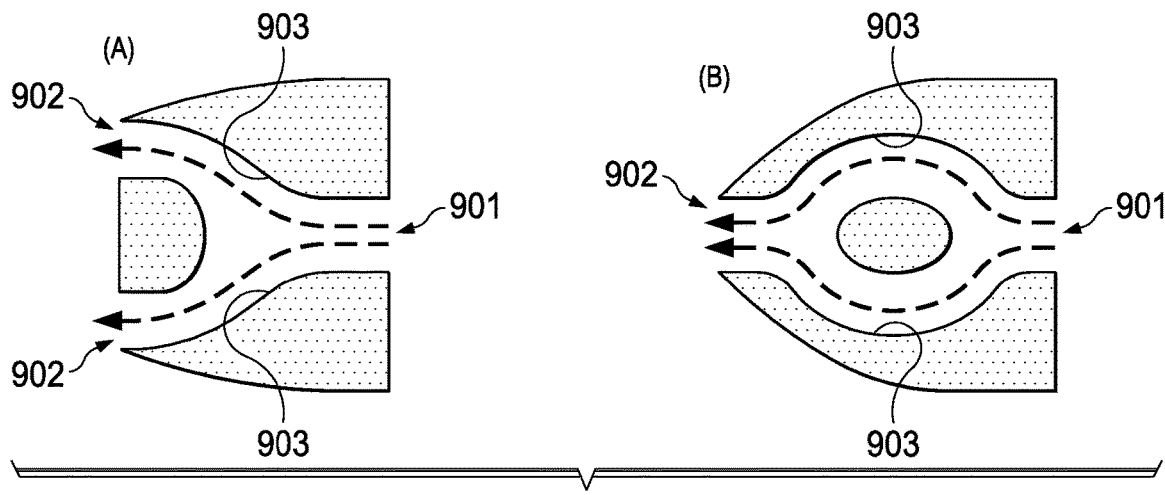
FIG. 4. Examples of Nozzles with Multiple Fluid Paths: (a) Two paths with two outlets, and (b) two paths with one outlet.
Figure 5:
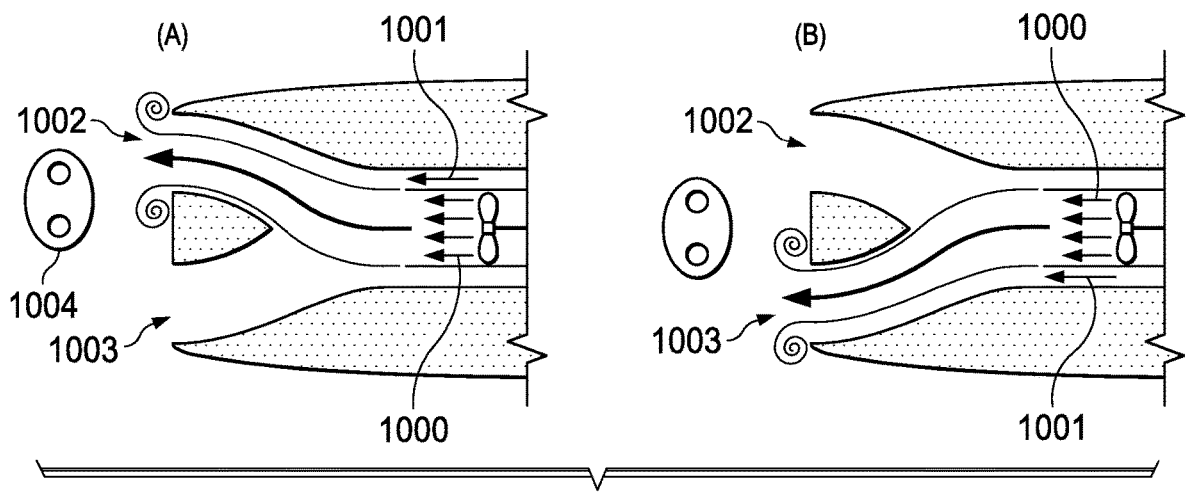
FIG. 5. Generation of Pulsed-Jet Flow Using Coanda-assisted Jet Vectoring with a Dual-Output Nozzle. Jet flow exiting (a) output A, and (b) output B.

An example of the second component of the present invention is a contoured nozzle with multiple paths (conduits) for the flow to exit the nozzle. The usual method will be to use a nozzle with one flow inlet (901) multiple flow outlets (902) as shown in FIG. 4(a), but a nozzle with one outlet and multiple flow conduits (903) may also be used (FIG. 4(b)). When such a nozzle is joined together with a vectored constant flow jet, a pulsed jet is created by alternately vectoring the jet between available flow conduits in the nozzle. As an example, the combination of a Coanda-assisted vectored jet with a two-output nozzle is shown in FIG. 5. The example embodiment shown in FIG. 5 uses a jet-pump impeller to generate the constant flow primary jet (1000) and the location of the control jet (1001) determines the conduit through which the primary jet flows. (A separate pumping mechanism, not shown, is required to generate the control jet in this embodiment.) When the control jet (1001) is switched from side to side (cf. FIGS. 5(a) and (b)), the constant flow jet (1000) is alternately switched between the two nozzle outputs (1002 and 1003). When the flow is switched to a new output, the flow through that output is suddenly initiated and a fluid pulse is ejected. When it is switched back to the other output, the flow at the original output ceases while a new jet pulse is initiated at the current output. The frequency of the pulsing is controlled by the frequency of switching of the constant flow primary jet. Rapidly switching the flow between conduits produces short jet pulses resulting in isolated vortex rings (1004) for high efficiency or augmented thrust (high acceleration). Slower switching leads to longer jet pulses for smoother operation while still producing a leading vortex ring with each pulse that offers a propulsive benefit over a purely continuous jet. Similarly, decreasing the flow rate of the primary jet for a constant switching (pulsing) frequency leads to shorter jet pulses while increasing the flow rate produces longer pulses. The ability to adjust the flow rate of the primary jet provides access to a wide bandwidth of speed. Moreover, because the primary jet is constant flow, it may be generated by any normal method and it may be produced under conditions of optimal efficiency (e.g., an impeller optimized for the desired flow rate may be used in the embodiment shown in FIG. 5). Thus, the invention combines the advantages of jet pulsation with efficient means for producing the jet flow. Note that for the valved jet vectoring method shown in FIG. 1(c) to be utilized with the present invention in a manner that keeps the flow of the primary jet substantially constant, one valve must always be open (i.e., pulsation is achieved by switching the location of the open valve, not by opening and closing valves).

Figure 6:
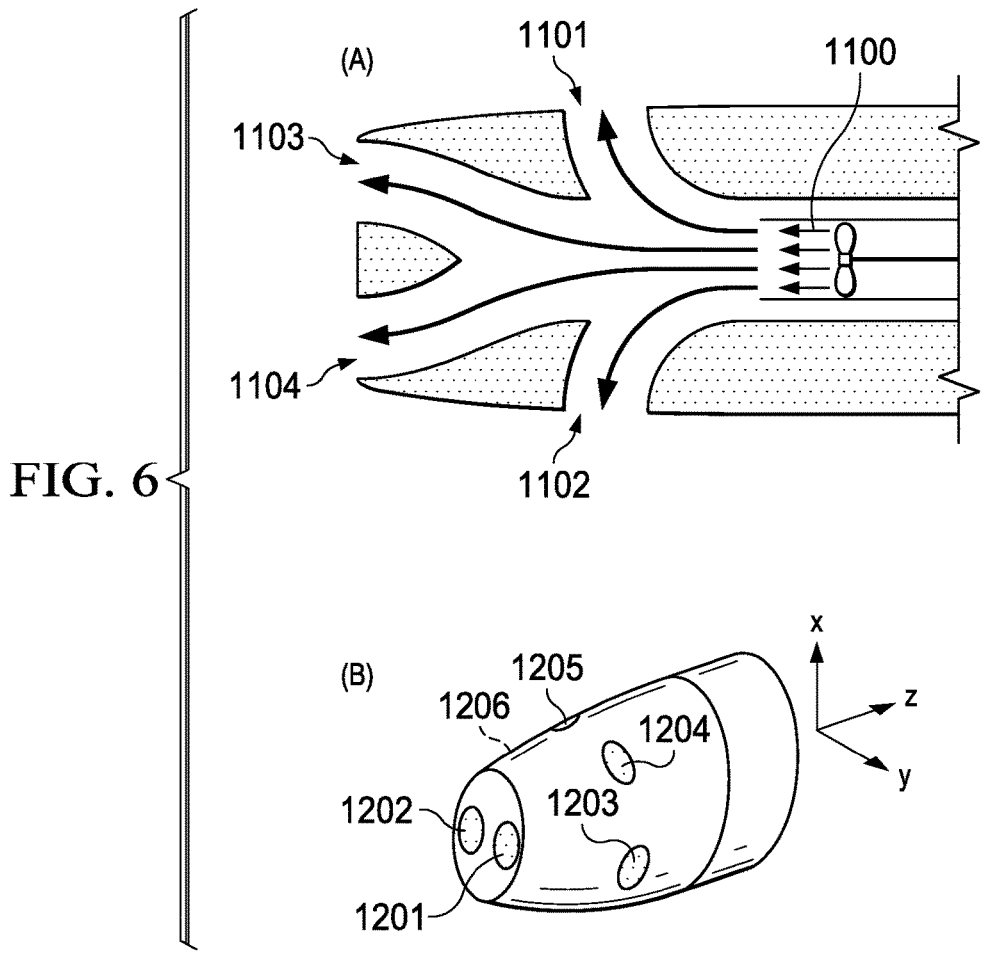
FIG. 6. Configurations for Thrust Vectoring: (a) Top View of a Nozzle with Multiple Flow Paths and Different Jet Exit Angles for Thrust Vectoring, (b) Isometric View of a 6-Orifice Nozzle for Thrust Vectoring in all Three Coordinate Directions.

FIG. 5 uses a nozzle with only two outlets. The invention may be easily extended to a nozzle with any number of outlets, provided a sufficiently versatile method for vectoring the jet to the different outlets is used. The invention may also be extended to use nozzles with contoured flow conduits exiting at different angles to effect thrust vectoring. An example allowing thrust vectoring is shown in FIG. 6(a) where vectoring the constant flow primary jet (1100) to output (1101) or (1102) produces a jet exiting to the side, which may be used to generate a turning or stabilizing force. Alternately, vectoring between outputs (1103) and (1104), on the other hand, produces a pulsatile driving force useful for propulsion, similar to that shown in FIG. 5. Other combinations may also be used, such as alternately vectoring the jet between outputs (1103) and (1101), which produces a pulsatile jet for propulsion (from output 1103) and a pulsatile side force (from output 1101) for steering. To achieve the level of vectoring control required for this arrangement, Coanda-assisted jet vectoring may be used, in which case the side on which the control jet (not shown) is used determines which pair of outputs (1103/1101 or 1104/1102) is accessible and the strength (mass flow rate) of the control jet determines which output in a given pair is accessed. For example, a strong control jet on the top side of the primary jet (1100) in FIG. 6(a) would deflect the primary jet (1100) to output (1101), whereas a weaker control jet on the top would deflect the primary jet (1100) to output (1103).

The hydrodynamics and propulsive performance of pulsed jets and vectored jets are both well understood as separate units, but integrating the two into a vectored pulsed-jet system and optimizing it for efficiency, maneuverability, station keeping, and stealth require careful design and testing. The present invention includes a device, methods, and systems for a vectored pulsed-jet propulsion system that build on knowledge of pulsed-jet propulsion and pulsed jet vectoring in, e.g., live squid and laboratory tests of static pulsed jets.

Figure 7:
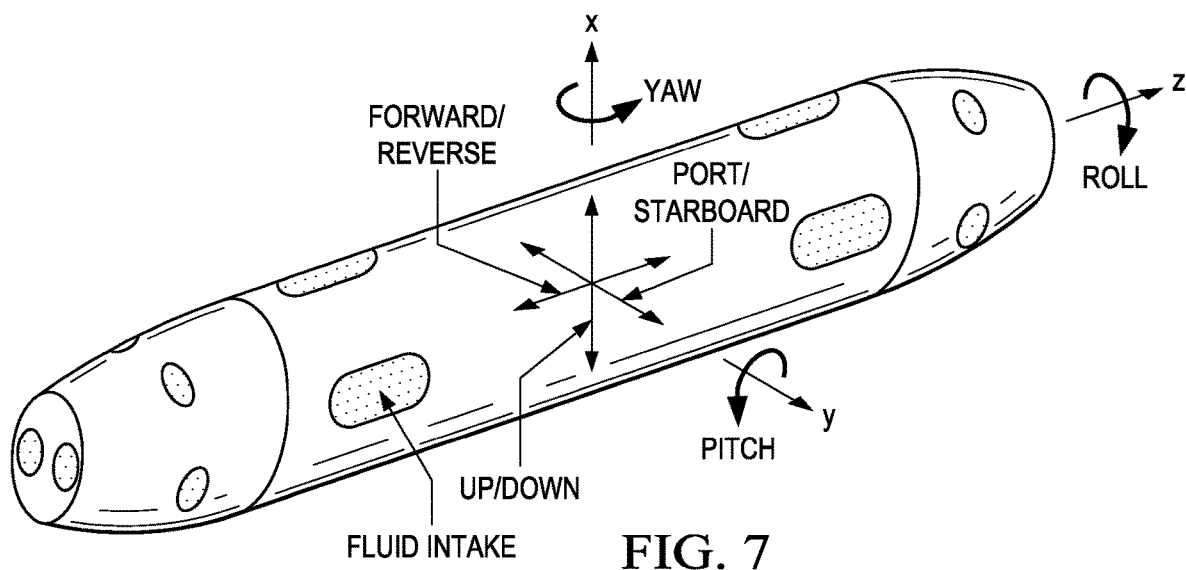
FIG. 7. An Unmanned Undersea Vehicle (UUV) with 6-dof Control Utilizing Vectored Pulsed-Jets on Each End.

Including additional orifices and vectoring the jet toward these locations can provide control over additional degrees of freedom (dof) for directional control and station keeping. For example, with the 6-outlet nozzle shown in FIG. 6(b), forward (+z) pulsatile thrust is achieved by alternating jet flow between outlets (1201) and (1202), a pulsatile side force (−y) is achieved by alternating jet flow between outlets (1203) and (1204), a pulsatile downward force (−x) is achieved by alternating jet flow between outlets (1204) and (1205), etc. Using two nozzle/vectored-jet complexes on each end of a torpedo-style Unmanned Undersea Vehicle (UUV) as shown in FIG. 7 can provide a 6-dof control for agile maneuvering, station keeping, and vertical transport while still providing efficient cruise operation. In this configuration, the $6^{th}$ dof (roll) is obtained by including directional vanes (not shown) in orifices (1203), (1204), (1205), and/or (1206) of the nozzle/vectored-jet complexes (FIG. 6(b)) so the side jets, can be vectored azimuthally to create a rolling moment. Operation of the nozzle/vectored-jet complexes can be coupled with an inertial navigation system and a basic control system to allow the UUV to perform a variety of maneuvers such as straight cruise, horizontal/vertical translation, and rotation about the pitch, yaw, and roll axes, etc. The invention described herein is unique from a fluid oscillator valve in that the present invention uses an independently controlled jet and fluid vectoring system that may control and vary the pulse frequency, pulse duration, and direction of the constant flow primary jet allowing for jet pulsing of arbitrary pulse frequency and duration and for thrust vectoring. In the usual embodiment of a fluid oscillator, the pulsing frequency is fixed once the geometry of the feedback loop(s) is set and no method of control is provided. Embodiments of fluid oscillators that do provide control of pulse frequency and/or duration do not utilize independent control of the primary jet. Moreover, the present invention allows for pulsatile jet flow to exit a multiplicity of nozzle outlets, while fluid oscillators only utilize two outlets. Hence, the combination of a controlled jet vectoring system and multiple-outlet nozzle claimed in the present invention is unique and not an improvement readily apparent to one skilled in the art.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

Allen, D. and Smith, B. L. (2009) Axisymmetric Coanda-assisted vectoring. *Exp. Fluids,* 46, 55-64.

Bartol, I. K., Krueger, P. S., Thompson, J. T., and Stewart, W. J. (2008) Swimming dynamics and propulsive efficiency of squids throughout ontogeny. *Int. Comp. Biol.,* 48, 720-733.

Bartol, I. K., Krueger, P. S., Stewart, W. J., and Thompson, J. T. (2009) Hydrodynamics of pulsed jetting in juvenile and adult brief squid *Lolliguncula brevis*: evidence of multiple jet 'modes' and their implications for propulsive efficiency. *J. Exp. Biol.* 212, 1889-1903.

Berrier, B. L. and Re, R. J. (1975) A Review of Thrust-Vectoring Schemes for Fighter Aircraft, AIAA-78-1023.

Choutapalli, I. M. (2006) *An Experimental Study of a Pulsed Jet Ejector*, Ph.D. Dissertation, Florida State University, Tallahassee, Fla.

Gharib, M., Rambod, E., and Shariff, K. (1998) A Universal Time Scale for Vortex Ring Formation, *J. Fluid Mech.,* 360, 121-140.

Krueger, P. S. and Gharib, M. (2005) Thrust Augmentation and Vortex Ring Evolution in a Fully-Pulsed Jet. *AIAA Journal,* 43, 792-801.

Mason, M. S., and Crowther, W. J. (2002) Fluidic thrust vectoring of low observable aircraft. *CEAS Aerospace Aerodynamic Research Conference*, Cambridge, U. K., June.

Nichols, J. T., Moslemi, A. A., and Krueger, P. S. (2008) Performance of a Self-Propelled Pulsed-Jet Vehicle. *AIAA Fluid Dynamics Conference*, Seattle, Wash., June (AIAA 2008-3720).

Smith, B. L., and Glezer, A. (2002) Jet vectoring using synthetic jets, *J. Fluid Mech.*, 458, 1-34.

Strykowski, P. J., Krothapalli, A., and Forliti, D. J. (1996) Counterflow Thrust Vectoring of Supersonic Jets. *AIAA J.*, 34, 2306-2314.

Ward, C. C. (2006) *Circulation Control Technique on a Marine Propeller Duct*. M.S. Thesis, University of Strathclyde, Glasgow, U. K.

Wilson, J., and Paxson, D. E. (2002) Unsteady Ejector Performance: An Experimental Investigation Using a Resonance Tube Driver. AIAA Paper 2002-3632.

What is claimed is:

1. A method for vectored jet thrust of a vehicle, the vehicle defining three mutually perpendicular axes, the method comprising:

generating a jet of substantially constant flow within the vehicle from an engine, wherein a downstream trajectory of the jet is vectored at one or more angles with respect to an axis of an upstream portion of the jet;

connecting the jet to at least two fluid conduits in fluid communication with the jet, the at least two fluid conduits being within the vehicle, wherein the at least two fluid conduits are in alignment with the jet; and positioning at least one respective outlet in fluid communication with each of the at least two fluid conduits, each respective outlet positioned on an outer surface of the vehicle and configured to exhaust at the outer surface of the vehicle, wherein fluid flow through each of the at least two fluid conduits is transiently variable by alternately vectoring the jet to each of the at least two fluid conduits, wherein exhaust at each of the respective outlets is transient while the jet is substantially constant, thereby providing vectored jet thrust, wherein the jet is alternately vectored to the at least two fluid conduits fluidically by secondary control jets, and wherein the respective outlets are positioned such that the vectored jet thrust can be directed parallel to each of the three mutually perpendicular axes.

2. The method of claim 1, wherein the secondary control jets alternately vector the jet by: (a) Coanda-assisted jet vectoring, (b) using a momentum conservation effect, (c) synthetic-jet actuator jet vectoring, or (d) counter-flow jet vectoring.

3. The method of claim 1, wherein the exhaust from each outlet comprises short pulses, generated by the alternate vectoring of the jet between the at least two fluid conduits, which generate compact vortex rings, wherein a frequency and a duration of the short pulses are independently controlled by varying a flow rate of the jet and a frequency of vectoring between the at least two fluid conduits.

4. The method of claim 1, wherein each outlet is capable of being oriented at different angles relative to the axis of the upstream portion of the jet to provide thrust vectoring, directional control, or propulsion.

5. The method of claim 1, wherein the engine is a ducted fan/propeller, a turbojet engine, a jet engine, a turboprop, a ramjet, a rocket, or a scramjet.

6. The method of claim 1, wherein the one or more angles with respect to the axis of the upstream portion of the jet comprise a multiplicity or a continuum of angles.

* * * * *